(12) United States Patent
Wang et al.

(10) Patent No.: US 9,924,353 B2
(45) Date of Patent: Mar. 20, 2018

(54) METHOD FOR CONFIGURING AND TRANSMITTING KEY

(71) Applicants: SAMSUNG ELECTRONICS CO., LTD., Samsung-ro, Yeongtong-gu, Suwon-si, Gyeonggi-do (KR); BEIJING SAMSUNG TELECOMMUNICATIONS TECHNOLOGY RESEARCH CO., LTD., Chaoyang District, Beijing (CN)

(72) Inventors: Hong Wang, Beijing (CN); Huarui Liang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 14/647,381

(22) PCT Filed: Dec. 30, 2013

(86) PCT No.: PCT/KR2013/012358
§ 371 (c)(1),
(2) Date: May 26, 2015

(87) PCT Pub. No.: WO2014/104849
PCT Pub. Date: Jul. 3, 2014

(65) Prior Publication Data
US 2015/0312757 A1 Oct. 29, 2015

(30) Foreign Application Priority Data

Dec. 28, 2012 (CN) .......................... 2012 1 0583709

(51) Int. Cl.
*H04W 4/00* (2009.01)
*H04W 12/04* (2009.01)
*H04W 72/04* (2009.01)

(52) U.S. Cl.
CPC ....... *H04W 12/04* (2013.01); *H04W 72/0406* (2013.01)

(58) Field of Classification Search
USPC .......................... 370/329, 330, 331, 333, 338
See application file for complete search history.

(56) References Cited

U.S. PATENT DOCUMENTS

2009/0220087 A1* 9/2009 Brusilovsky .......... H04L 63/062
380/272
2011/0044455 A1* 2/2011 Huang .................. H04W 12/04
380/278
(Continued)

FOREIGN PATENT DOCUMENTS

CN 102651894 A 8/2012
EP 2456244 A1 5/2012
(Continued)

*Primary Examiner* — Zewdu A Beyen
(74) *Attorney, Agent, or Firm* — Jefferson IP Law, LLP

(57) ABSTRACT

The present application discloses a method for configuring and transmitting a key, which includes that: a) a serving cell (PCell) of UE determines a key (KeNB) used by a SCell and transmits the KeNB to the SCell; and b) the PCell transmits configuration information for configuring the SCell to the UE after receiving a response message from the SCell, and receives a response message from the UE. Or, the method includes that: a SCell of UE transmits a cell key request to a MME and receives key information from the MME; and the SCell transmits the key information received from the MME to the UE, and receives a response message from the UE. By the present application, data of the SCell is transmitted after being encrypted, so as to avoid a case that the data is decoded by other users, and further guarantee the security of the data.

20 Claims, 6 Drawing Sheets

(56) References Cited

U.S. PATENT DOCUMENTS

| | | | |
|---|---|---|---|
| 2011/0274276 A1 | 11/2011 | Xu | |
| 2012/0039468 A1* | 2/2012 | Ishida | H04W 12/04 380/247 |
| 2012/0142361 A1* | 6/2012 | Zhao | H04W 36/28 455/446 |
| 2012/0157053 A1 | 6/2012 | Iwamura et al. | |

FOREIGN PATENT DOCUMENTS

| | | |
|---|---|---|
| JP | 2009-253985 A | 10/2009 |
| JP | 2012-134975 A | 7/2012 |
| KR | 10-2011-0017426 A | 2/2011 |
| WO | 2015-068799 A1 | 5/2015 |

\* cited by examiner

[Fig. 1]
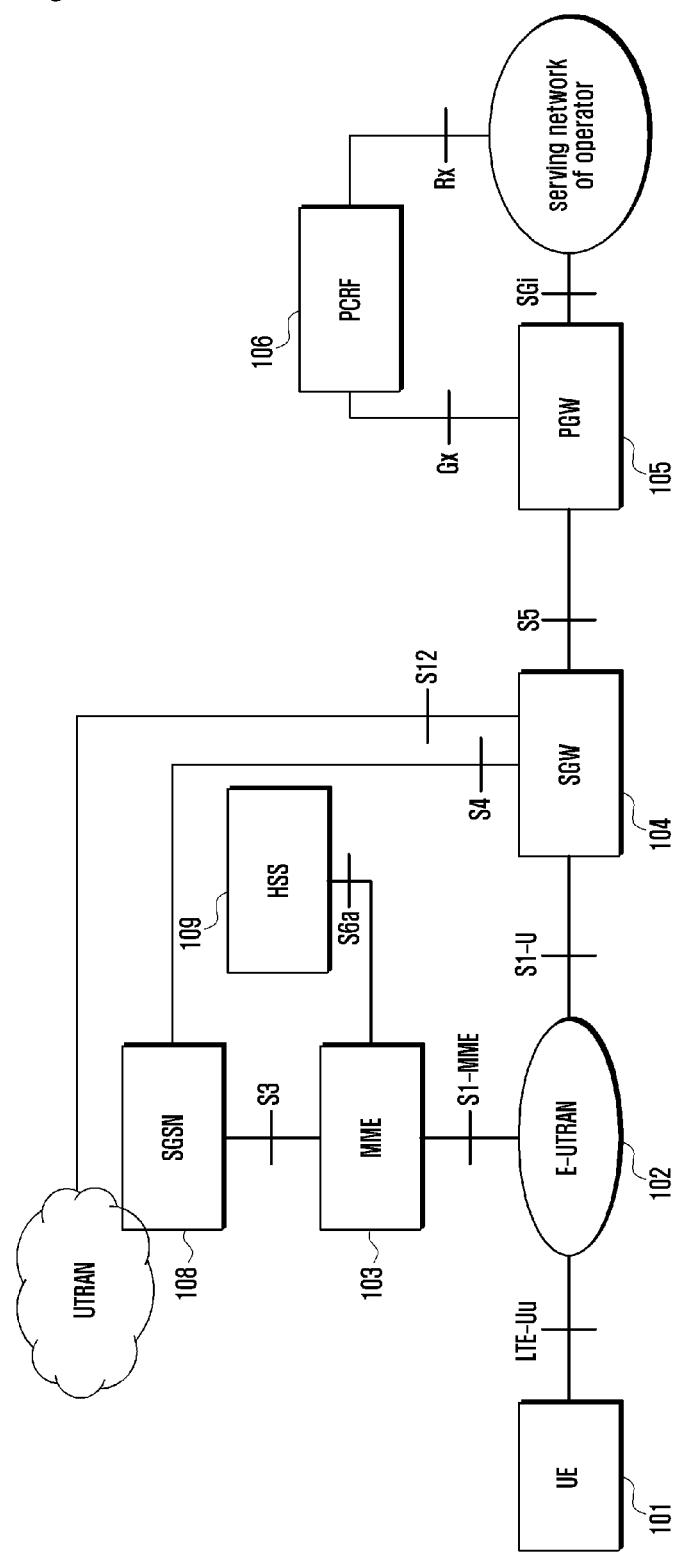

[Fig. 2]
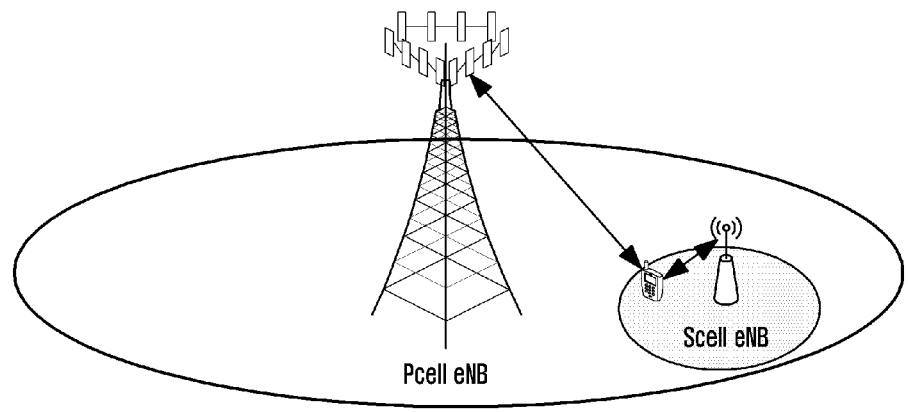
[Fig. 3]
a serving cell (PCell) of UE determines a KeNB used by a SCell, and transmits the KeNB to the SCell ~301
after the PCell receives a response message from the SCell, the PCell transmits the KeNB used by the SCell to the UE, and receives a response message from the UE ~302

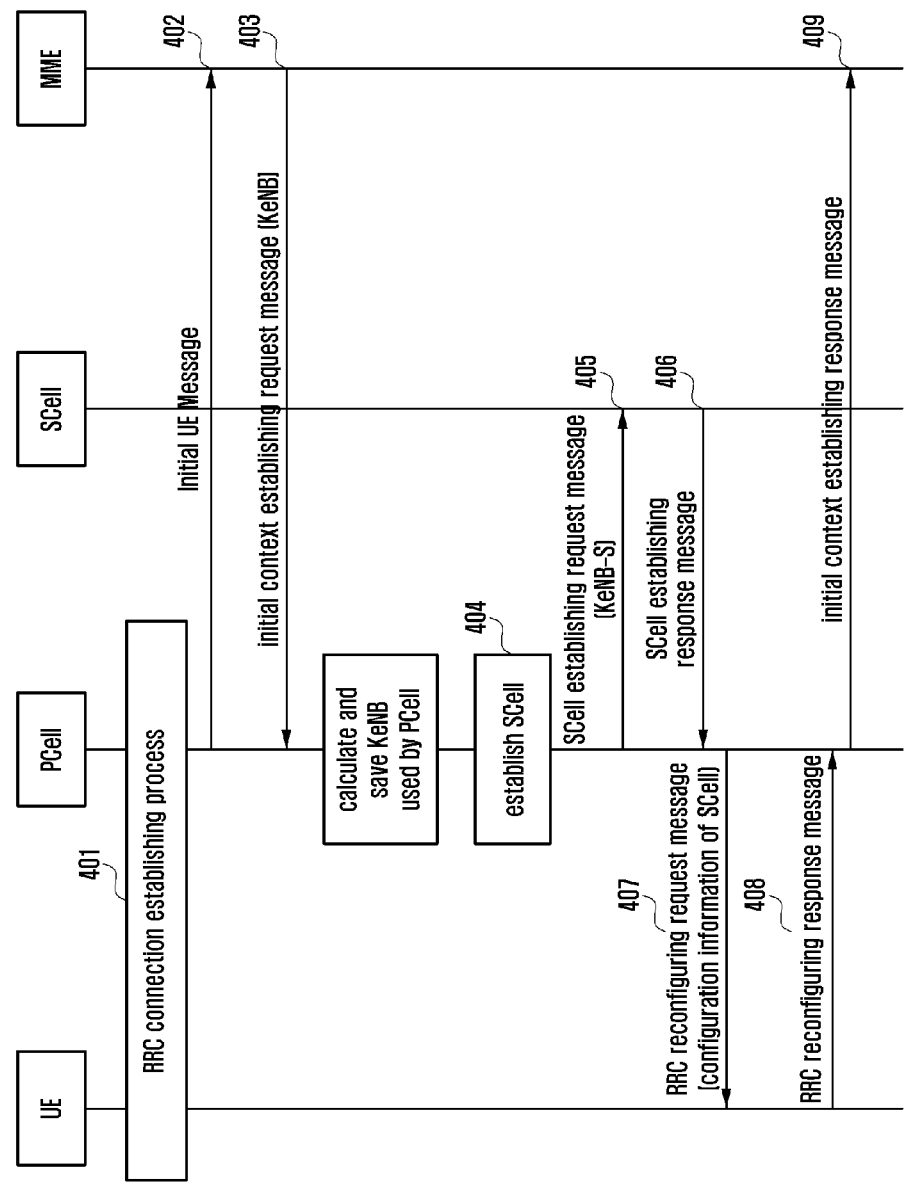

[Fig. 5]
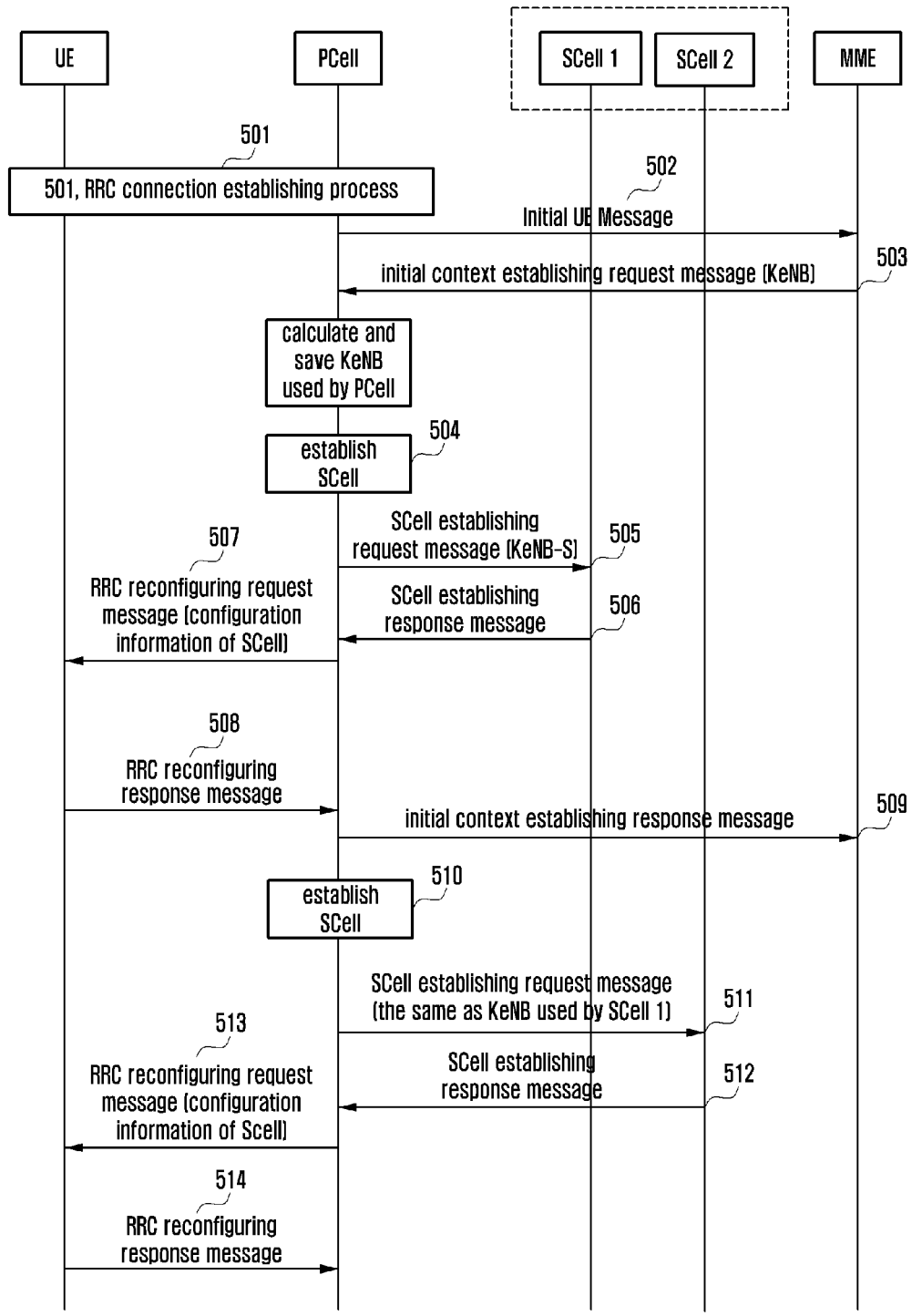

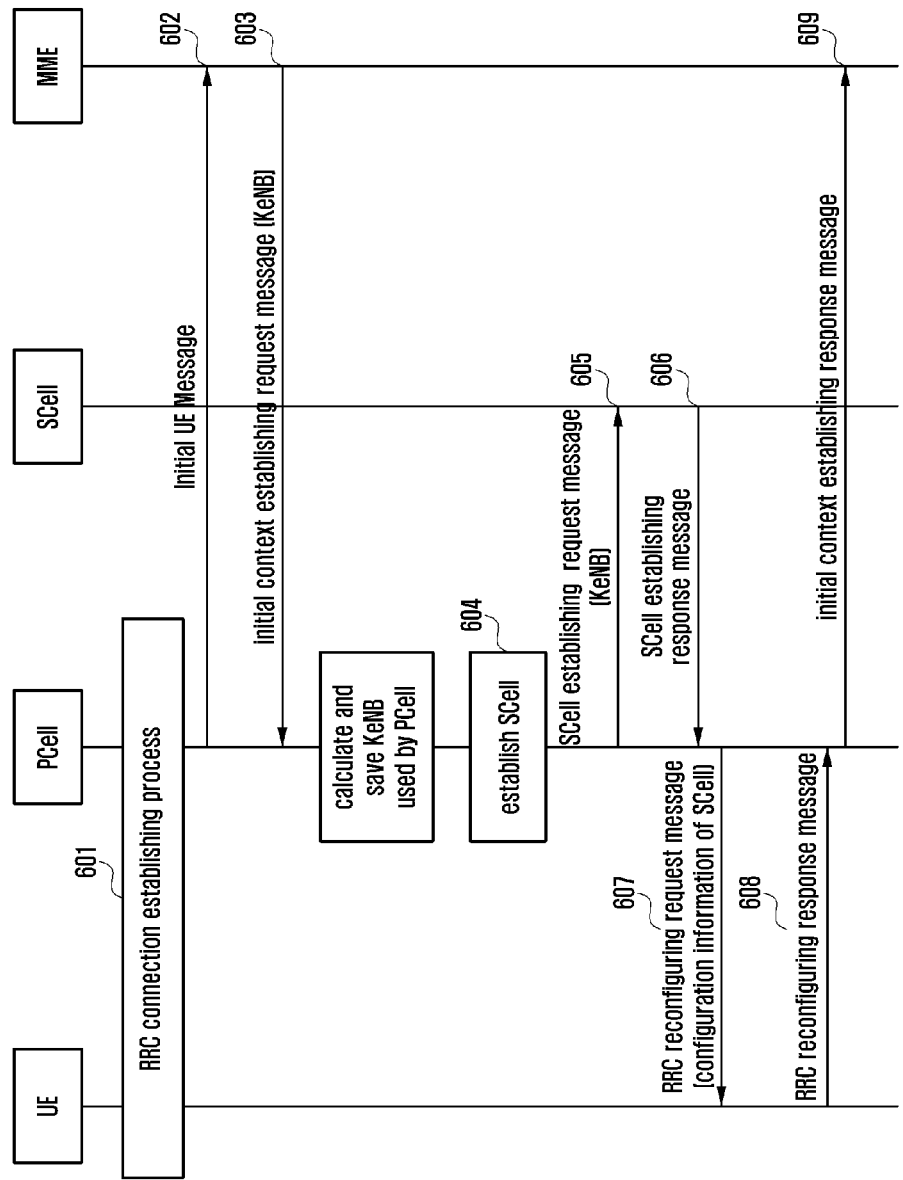

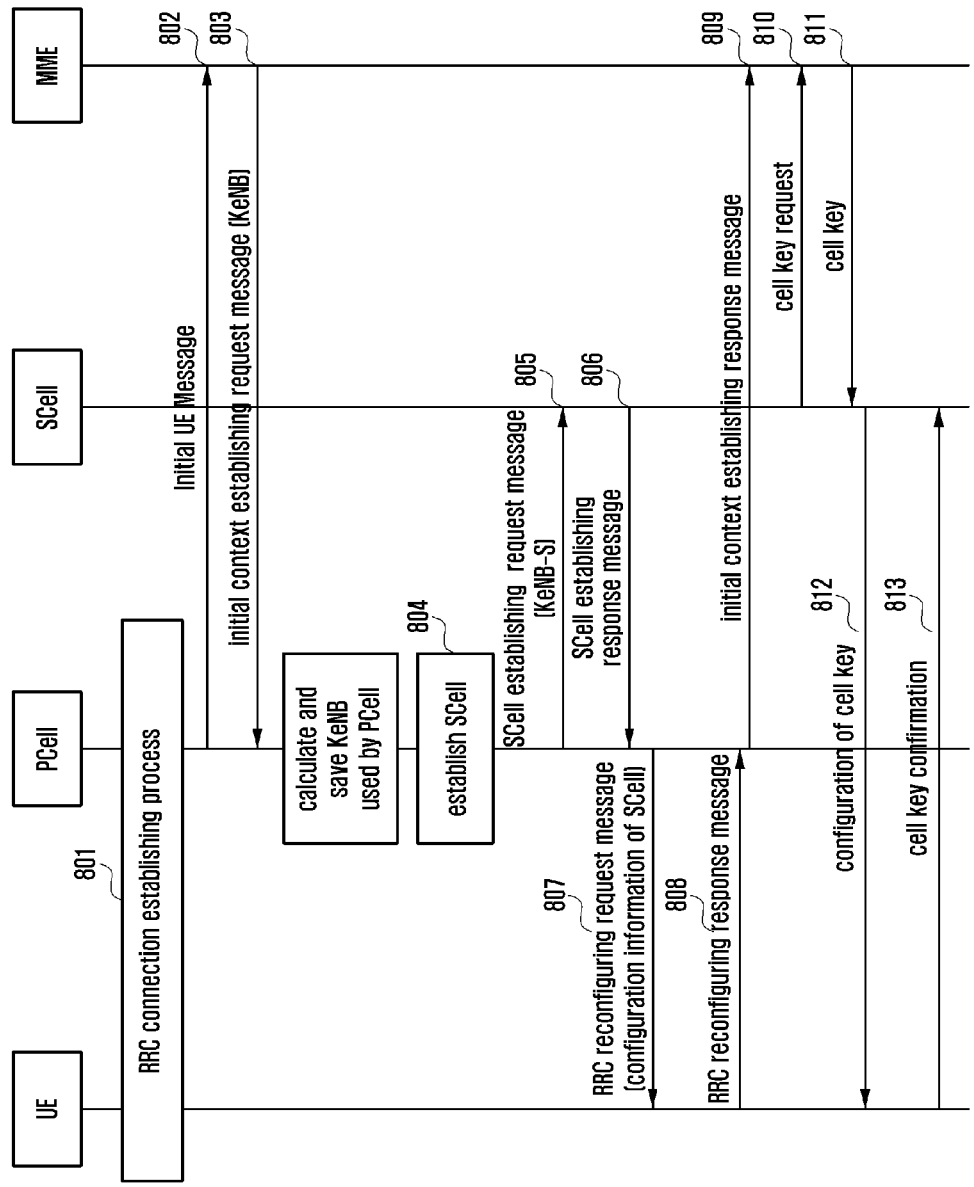

METHOD FOR CONFIGURING AND TRANSMITTING KEY

TECHNICAL FIELD

The present application relates to radio communication technologies, and more particularly to a method for configuring and transmitting a key.

BACKGROUND ART

Modern mobile communication technology tends to provide high-data-rate multimedia services for users. FIG. 1 is a schematic diagram illustrating the structure of a System Architecture Evolution (SAE).

In FIG. 1, User Equipment (UE) 101 is a terminal device for receiving data. An Evolved Universal Terrestrial Radio Access Network (E-UTRAN) 102 is a radio access network which includes an eNodeB/NodeB for providing a radio network interface for the UE. A Mobile Management Entity (MME) 103 is configured to manage mobility contexts, session contexts and security information of the UE. A Serving Gateway (SGW) 104 is configured to provide functions of a subscriber plane. The MME 103 and the SGW 104 may be located in the same physical entity. A Packet Gateway (PGW) 105 is configured to implement charging and legal monitoring functions. The PGW 105 and the SGW 104 may be located in the same physical entity. A Policy and Charging Rules Function (PCRF) 106 is configured to provide QoS policies and charging rules. A Service GPRS Supporting Node (SGSN) 108 is a network node device for providing routing for data transmission in a Universal Mobile Telecommunications System (UMTS). A Home Subscriber Server (HSS) 109 is a home subsystem of the UE and is configured to protect user information including the current location of the UE, the address of a serving node, user security information and packet data contexts of the UE.

In current Long Term Evolution (LTE) system, each cell supports bandwidth of 20 MHz at most. In order to increase the peak rate of UE, a Carrier Aggregation (CA) technology is introduced in a LTE-Advanced system. Through the CA technology, the UE may communicate with multiple cells that are managed by the same evolved Node B (eNB) and work on different frequencies, which makes transmission bandwidth up to 100 MHz and doubles the uplink and downlink peak rate of the UE.

In order to increase the transmission bandwidth, one user may be served by multiple cells, and these cells may be located in one eNB or multiple eNBs, and thus this technology is called CA technology. FIG. 2 is a schematic diagram illustrating cross-eNB CA. For UE working in the case of CA, aggregated cells include a Primary Cell (PCell) and a Secondary Cell (SCell). There is only one PCell, and the PCell is a serving cell and is always in an active state. The PCell can be handed over only through a handover process. The UE transmits and receives Non-Access Stratum (NAS) information only in the PCell, and a Physical Uplink Control Channel (PUCCH) is transmitted only in the PCell.

In a current system, the MME needs to encrypt signalings of non-access layer and the eNB needs to encrypt Radio Resource Control (RRC) signalings and data. The MME calculates an initial key (KeNB) and transmits the KeNB to the eNB. Further, the MME transmits a set of parameters (Next Hop, called NH for short, and Next Hop Counter, called NCC for short) to the eNB through a handover message. These parameters may be used for calculating the KeNB. In an X2 handover process, a source eNB calculates a KeNB used by a destination eNB. The KeNB used by the destination eNB may be a new KeNB that is generated based on a KeNB currently used and also referring to the downlink frequency and Protocol Control Information (PCI) of the destination eNB. This method is called a horizontal generating method. The KeNB used by the destination eNB may also be generated according to the NH and NCC saved by the source eNB. This method is called a vertical generating method. These methods have been defined in a current protocol 3GPP 33.401. The UE generates its KeNB by using the same algorithm as that used by the MME. When the UE performs X2 or S1 handover, the eNB transmits a message to the UE, to inform the UE of the NCC used currently by the eNB and indicate the UE to generate a new KeNB. The UE generates the new KeNB according to the horizontal or vertical generating method. The NCC is used to determine which one of the horizontal generating method and the vertical generating method is used by the UE. If the NCC is the same as the NCC corresponding to the KeNB used currently by the UE, the UE uses the horizontal generating method, and if the NCC is different from the NCC corresponding to the KeNB used currently by the UE, the UE uses the vertical generating method.

DISCLOSURE OF INVENTION

Technical Problem

Conventional transmission and calculation methods of KeNB are all applied to the case that only one cell encrypts data. That is, a key used by the serving cell has been defined in the current protocol. In cross-eNB CA technology, the SCell also participates in data transmission, and thus data should also be encrypted. In this case, multiple cells need to encrypt data, but it is not defined in the current protocol that how a key used by the SCell is configured.

Solution to Problem

The present application provides several methods for configuring a key. In the case of establishing a data bearer between UE and multiple eNBs, data on these links may be encrypted with a key.

A method for configuring and transmitting a key includes:

a) determining, by a serving cell (Primary Cell (PCell)) of User Equipment (UE), a key (KeNB) used by a Secondary Cell (SCell), and transmitting the KeNB to the SCell; and b) transmitting, by the PCell, configuration information for configuring the SCell to the UE after receiving a response message from the SCell, and receiving a response message from the UE.

Preferably, the determining, by the PCell, the KeNB used by the SCell comprises: calculating, by the PCell, the KeNB according to the downlink frequency and physical cell identity of the SCell.

Preferably, the KeNB used by the SCell is the same as a KeNB used by another SCell located in an evolved Node B (eNB) where the SCell is located.

Preferably, the PCell determines that the KeNB used by the SCell is the same as a KeNB used by the PCell.

Preferably, in step a), a SCell establishing request message comprises the KeNB used by the SCell and the SCell establishing request message is transmitted to the SCell.

Preferably, in step a), a SCell establishing request message comprises indication information of the KeNB and the SCell establishing request message is transmitted to the SCell, wherein the indication information is used for indicating that the KeNB used by the SCell is the same as a KeNB used by another SCell located in an eNB where the SCell is located.

Preferably, when the KeNB used by the SCell is the same as a KeNB used by a primary SCell located in the eNB where the SCell is located, the SCell establishing request message comprises an X2 interface identity of the UE, wherein the X2 interface identity of the UE is used as the indication information of the KeNB and is used for indicating the SCell to determine a context of the UE according to the X2 interface identity of the UE and obtain the KeNB used by the SCell.

Preferably, in step b), the configuration information for configuring the SCell comprises the KeNB used by the SCell and the configuration information is transmitted to the UE.

Preferably, in step b), the configuration information does not include the KeNB used by SCell, which indicates that the KeNB used by the SCell is same as the KeNB used by the PCell.

Preferably, in step b), the configuration information for configuring the SCell comprises indication information of the KeNB and the configuration information is transmitted to the UE, wherein the indication information is used for indicating that the KeNB used by the SCell is the same as a KeNB used by another SCell.

Preferably, when the KeNB used by the SCell is the same as a KeNB used by a primary SCell located in an eNB where the SCell is located, the configuration information for configuring the SCell does not comprise the KeNB to indicate the UE to obtain the KeNB from a context of the UE;

or, the indication information of the KeNB is a cell identity of said another SCell.

A method for configuring and transmitting a key includes:

a) transmitting, by a Secondary Cell (SCell) of User Equipment (UE), a cell key request to a Mobile Management Entity (MME), and receiving key information from the MME; and b) transmitting, by the SCell, the key information received from the MME to the UE, and receiving a response message from the UE.

Preferably, the key information is information for calculating a KeNB used by the SCell or is the KeNB used by the SCell.

As can be seen from the above solution of the present application, by the methods for configuring the key for the SCell, data of the SCell is transmitted after being encrypted, so as to avoid a case that the data is decoded by other users, and further guarantee the security of the data.

BRIEF DESCRIPTION OF DRAWINGS

FIG. 1 is a schematic diagram illustrating the structure of a SAE.

FIG. 2 is a schematic diagram illustrating cross-eNB CA.

FIG. 3 is a flowchart illustrating a method for configuring and transmitting a KeNB by a PCell according to the present application.

FIG. 4 is a flowchart illustrating a method according to a first example of the present application.

FIG. 5 is a flowchart illustrating a method according to a second example of the present application.

FIG. 6 is a flowchart illustrating a method according to a third example of the present application.

FIG. 7 is a flowchart illustrating a method for configuring a KeNB for a SCell by the MME according to the present application.

FIG. 8 is a flowchart illustrating a method according to a fourth example of the present application.

MODE FOR THE INVENTION

In order to make the object, technical solution and merits of the present application clearer, the present application will be illustrated in detail hereinafter with reference to the accompanying drawings.

The present application provides two methods for configuring and transmitting a KeNB used by a SCell. In one method, the KeNB is configured and transmitted by a PCell, and in the other method, the KeNB is configured by the MME. The two methods are illustrated respectively hereinafter.

FIG. 3 is a flowchart illustrating a method for configuring and transmitting a KeNB by a PCell according to the present application. As shown in FIG. 3, the method includes following blocks.

In block 301, a serving cell (PCell) of UE determines a KeNB used by a SCell, and transmits the KeNB to the SCell.

In block 302, after the PCell receives a response message from the SCell, the PCell transmits the KeNB used by the SCell to the UE, and receives a response message from the UE.

When the PCell determines the KeNB used by the SCell, the PCell may make the KeNB used by the Scell different from a KeNB used by the PCell. For example, the PCell may calculate the KeNB used by the SCell according to the downlink frequency and cell identity of the SCell and the KeNB used by the PCell. Or, the PCell may make the KeNB used by the Scell identical to the KeNB used by the PCell. The method is illustrated in detailed hereinafter with reference to three examples.

A first example describes a method for configuring and transmitting, by the PCell, the KeNB used by the SCell. In this method, the KeNB used by the PCell is different from the KeNB used by the SCell. The MME configures an initial KeNB for the PCell. When the UE moves, a KeNB used by the serving cell of the UE needs to be recalculated. The calculation method of the KeNB used by the serving cell of the UE is the same as a current method, and is not illustrated herein. An eNB 1 is an eNB where the serving cell of the UE is located, i.e., the PCell of the UE, and an eNB 2 is an eNB where the SCell of the UE is located and provides a data bearer for the UE. The eNB 2 receives downlink data from a serving gateway or the eNB 1 and transmits the data to the UE. There is an X2 interface between the eNB 1 and the eNB 2. Hereinafter, the cell and the eNB are not differentiated any more, and if the cell transmits/receives data, it means that the eNB where the cell is located transmits/receives the data. A signaling communication process between the MME and the gateway is omitted. The method shown in FIG. 4 includes following blocks.

In block 401, an RRC connection establishing process is provided. The object of this process is to establish an RRC connection between the UE and the PCell. This process is the same as a current defined process and is omitted herein.

In block 402, the PCell of the UE transmits an Initial UE Message to the MME, where the Initial UE Message is the first S1 interface message and contains an S1 interface identity of the UE and a non-access message.

In block 403, the MME transmits an initial context establishing request message to the PCell of the UE.

The MME transmits the initial context establishing request message to establish a context of the UE on the eNB. The initial context establishing request message contains the S1 interface identity of the UE, which uniquely identifies the UE at the S1 interface. The initial context establishing request message further contains the capability information of the UE and information of to-be-established LTE E-UTRAN Radio Access Bearer (E-RAB). The information of to-be-established LTE E-RAB contains an identity and QoS information of the E-RAB, and a transport layer address and tunnel port identity of serving gateway receiving uplink data. The initial context establishing request message contains an initial key (KeNB).

The serving cell of the UE, i.e., the PCell, saves the KeNB in the context of the UE, and encrypts signalings and data with the KeNB in subsequent signaling transmission and data transmission. If the serving cell of the UE is handed over or the MME updates the KeNB, the calculation method of KeNB used by the new serving cell is the same as a current defined method. Herein, suppose the serving cell obtains its KeNB according to the current defined method.

In block 404, the PCell decides to establish a new SCell for the UE.

The PCell makes the decision based on different reasons. A first reason is because the load of the PCell is large and the SCell may transmit data of the UE, so as to share the load the PCell. A second reason is because the MME requests the PCell to establish a new bearer and the PCell decides to establish the new bearer in the SCell. The SCell is selected based on the channel quality of the cell detected by the UE, and the UE reports the detected channel quality to the PCell through a measurement report. The new SCell and the PCell are located in different eNBs. Suppose the new SCell is located in the eNB 2.

In block 405, the PCell transmits a SCell establishing request message to the SCell, and requests the eNB where the SCell is located to establish a new bearer for the UE.

The serving cell of the UE decides to establish the bearer in the SCell. The eNB 1 may select the SCell according to radio signal quality. Suppose the SCell is located in the eNB 2, and the eNB 1 transmits a message to the eNB 2. The name of the message may be another name. The message contains an identity of destination cell, the X2 interface identity of the UE, information of to-be-established LTE E-RAB. The information of to-be-established LTE E-RAB contains an identity and QoS information of the E-RAB, and a transport layer address and tunnel port identity of serving gateway (or the eNB 1) receiving uplink data.

The PCell determines the KeNB used by the Scell. The PCell determines the KeNB used by the SCell according to the KeNB used by the PCell and the downlink power and physical cell identity of the SCell. The SCell establishing request message contains the KeNB used by the SCell.

In block 406, the SCell transmits a SCell establishing response message to the PCell.

The eNB 2 confirms that the SCell is established successfully, and transmits a message to the eNB 1. The SCell establishing response message contains information of the SCell newly located in the eNB 2, and a transport layer address and tunnel port identity of serving gateway receiving downlink data.

The information of cell may contain a Physical Cell Identity (PCI), cell identity, Public Land Mobile Network (PLMN) identity, uplink and downlink frequency and bandwidth of the cell, and further contains the number of antenna ports, information of Multicast Broadcast Single Frequency Network (MBSFN) subframe, and the configuration of Physical Random Access Channel (PRACH). The information of cell further contains the general configuration of PDSCH of the cell, such as the reference signal power of the PDSCH and P-B. The information of serving cell further contains the configuration of Physical Hybrid ARQ Indicator Channel (PHICH), such as information indicating that the duration of the PHICH is normal or extended, and resources of the PHICH.

In block 407, the PCell transmits a RRC reconfiguring request message to the UE, where the RRC reconfiguring request message contains the configuration information of the SCell. The configuration information of the SCell contains an identity of the SCell and the KeNB used by the SCell. The identity of the SCell may be a physical cell identity, a unique cell identity of the SCell, or an identity with other form.

In this example, the UE saves one KeNB for each SCell, and the KeNB is used to encrypt and decrypt data of the SCell.

In block 408, the UE transmits a RRC reconfiguring response message to confirm that the SCell is configured successfully at the UE side.

In block 409, the PCell transmits an initial context establishing response message to the MME.

The eNB 1 informs the MME that the context of the UE is established successfully, and informs the MME of the information of bearer established successfully by the eNB1. The initial context establishing response message contains the S1 interface identity of the UE, the identity of the bearer established successfully, the transport layer address and tunnel port identity of eNB receiving downlink data. The initial context establishing response message contains an identity (eNB Id) of the eNB 2 where the SCell is located, and a cell identity of the SCell.

And thus, the process described in the first example ends.

In the second example, multiple SCells are located in one eNB, and the PCell configures and transmits the KeNB used by the SCell. In this example, the KeNB used by the PCell is different from the that used by the SCell, and KeNBs used by SCells located in one eNB are the same. The MME configures an initial KeNB for the PCell. When the UE moves, the KeNB used by the serving cell of the UE needs to be recalculated. The calculation method of the KeNB used by the serving cell of the UE is the same as the current method and is not illustrated herein. The eNB 1 is an eNB where the serving cell of the UE is located, i.e., the PCell of the UE, and the eNB 2 is an eNB where the SCell of the UE is located and provides a data bearer for the UE. The eNB 2 receives downlink data from a serving gateway or the eNB 1 and transmits the data to the UE. There is an X2 interface between the eNB 1 and the eNB 2. Hereinafter, the cell and the eNB are not differentiated any more, and if the cell transmits/receives data, it means that the eNB where the cell is located transmits/receives the data. A signaling communication process between the MME and the gateway is omitted. The method shown in FIG. 5 includes following blocks.

Blocks 501 to 509 are the same as blocks 401 to 409 respectively and are omitted herein. After blocks 501 to 509 are performed, a SCell 1 has been established in the eNB, and a KeNB used by the SCell 1 has been configured.

In block 510, the PCell decides to establish a new SCell for the UE.

The PCell makes the decision based on different reasons. A first reason is because the load of the PCell is large and the SCell may transmit data of the UE, so as to share the load the PCell. A second reason is because the MME requests the PCell to establish a new bearer and the PCell decides to establish the new bearer in the SCell. The SCell is selected based on the channel quality of the cell detected by the UE, and the UE reports the detected channel quality to the PCell through a measurement report. The new SCell and the PCell are located in different eNBs. Suppose the new SCell is located in the eNB 2.

In block 511, the PCell transmits a SCell establishing request message to the SCell, and requests the eNB where the SCell is located to establish the new bearer for the UE.

Suppose a newly established SCell 2 and the SCell 1 are located in the same eNB. The SCell 2 may use the same KeNB as that used by the SCell 1, and data of the SCell 2 is encrypted with the same KeNB as that used by the SCell 1. The SCell establishing request message contains the X2 interface identity of the UE, information of to-be-established bearer and an identity of the SCell 2. The identity of the SCell 2 may be a physical cell identity or a unique Cell Global Identity (CGI). The SCell establishing request message in block 511 further contains indication information for indicating that the KeNB used by the SCell 2 is the same as that used by the SCell 1. This indication information may be implemented through several methods.

In a first method, in multiple SCells located in one eNB, a SCell 1 is defined as a primary SCell. Only an X2 interface is established between the eNB where the PCell is located and the eNB where the SCell 1 is located, and the communication between the PCell and the multiple SCells is forwarded by the SCell 1. In the SCell establishing request message in block 405, the PCell indicates that the SCell 1 is a primary SCell located in the eNB 2, or in the SCell establishing response message in block 406, the eNB 2 indicates that the SCell 1 is a primary SCell located in the eNB 2. The primary SCell and the KeNB used by the primary SCell are saved in the context of the UE served by the eNB 2. The SCell establishing request message in block 511 contains the X2 interface identity of the UE, through which the eNB 2 finds the context of the UE, obtains the KeNB and uses the KeNB to encrypt the data of the SCell 2.

In a second method, the SCell establishing request message in block 511 contains the KeNB used by the SCell 2.

In a third method, the SCell establishing request message in block 511 contains indication information for indicating that the KeNB used by the SCell 2 is the same as the KeNB used by which cell, such as the identity of the SCell 1.

In block 512, the SCell 2 transmits a SCell establishing response message to the PCell.

The eNB 2 confirms that the SCell is established successfully, and transmits a message to the eNB 1. The SCell establishing response message contains information of SCell newly located in the eNB 2, a transport layer address and tunnel port identity of eNB receiving downlink data.

The information of cell may contain a Physical Cell Identity (PCI), cell identity, Public Land Mobile Network (PLMN) identity, uplink and downlink frequency and bandwidth of the cell, and further contains the number of antenna ports, information of Multicast Broadcast Single Frequency Network (MBSFN) subframe, and the configuration of Physical Random Access Channel (PRACH). The information of cell further contains the general configuration of PDSCH of the cell, such as the reference signal power of the PDSCH and P-B. The information of serving cell further contains the configuration of PHICH, such as information indicating that the duration of the PHICH is normal or extended, and resources of the PHICH.

In block 513, the PCell transmits a RRC reconfiguring request message to the UE, where the RRC reconfiguring request message contains the configuration information of the SCell. The configuration information of the SCell contains the identity of the SCell 2 and the KeNB used by the SCell. The identity of the SCell may be a physical cell identity, or a unique cell identity of the SCell, or an identity with other form.

Or, the configuration information of the SCell contains the identity of the SCell 2, and indication information for indicating that the KeNB used by the SCell is the same as the KeNB used by which cell. Identical to block 511, the indication information may be implemented through several methods.

For example, if the identity of the SCell 1 is contained, it means that the KeNB used by the SCell 2 is the same as that used by the SCell 1. The identity of cell may be a physical cell identity, or a unique identity of the cell, or an identity with other form. Or, the configuration information of the SCell contains the KeNB used by the SCell 2. Or, in a former block, e.g., block 407, the configuration information of the SCell indicates the UE that a certain SCell is a primary SCell located in a certain eNB, the configuration information of the SCell is saved in the UE, and other SCells located in the eNB all use the same KeNB as that used by the primary SCell. In block 513, the configuration information of the SCell does not contain the KeNB used by the Scell, and the UE finds the KeNB used by the SCell according to the saved context of the UE.

Different from the first example, in the second example, the UE saves one KeNB for all SCells located in each eNB, and uses the KeNB to encrypt the data of the SCell.

In block 515, the UE transmits an RRC reconfiguring response message to confirm that the SCell is configured successfully at the UE side.

And thus, the process described in the second example ends.

A third example describes a method for configuring and transmitting, by the PCell, the KeNB used by the SCell. The MME configures an initial KeNB for the PCell. When the UE moves, the KeNB used by the serving cell of the UE needs to be recalculated. The calculation method of the KeNB used by the serving cell of the UE is the same as a current method, and is not illustrated herein. The eNB 1 is an eNB where the serving cell of the UE is located, that is, the PCell of the UE, and eNB 2 is an eNB where the SCell of the UE is located and provides a data bearer. The eNB 2 receives downlink data from a serving gateway or the eNB 1 and transmits the data to the UE. There is an X2 interface between the eNB 1 and the eNB 2. Hereinafter, the cell and the eNB are not differentiated any more, and if the cell transmits/receives data, it means that the eNB where the cell is located transmits/receives the data. A signaling communication process between the MME and the gateway is omitted. The method shown in FIG. 6 includes following blocks.

Blocks 601 to 609 are almost identical to blocks 401 to 409, and thus only difference is described herein.

In block 604, the PCell decides to establish a new SCell for the UE. The PCell also decides that the KeNB used by the new SCell is the same as that used by the PCell.

In block 605, the PCell transmits a SCell establishing request message to the SCell, and requests the eNB where the SCell is located to establish a new bearer for the UE. The SCell establishing request message contains the KeNB that is the same as that used by the PCell.

In block 607, the PCell transmits an RRC reconfiguring request message to the UE, where the RRC reconfiguring request message contains the configuration information of the SCell.

The configuration information of the SCell contains the identity of the SCell 2 and does not contain the KeNB, which means that the KeNB used by the SCell is the KeNB saved in the context of the UE, i.e., the KeNB used by the PCell.

In this example, the UE only saves one KeNB, which is used by the PCell and the SCell.

In block 608, the UE transmits an RRC reconfiguring response message to confirm that the SCell is configured successfully at the UE side.

And thus, the process described in the third example ends.

The forgoing is the first method for configuring and transmitting the KeNB used by the SCell provided by the present application.

FIG. 7 is a flowchart illustrating a method for configuring a KeNB for a SCell by the MME according to the present application. In this method, the MME configures the KeNB used by the SCell. As shown in FIG. 7, the method includes following blocks.

In block 701, after the SCell is established, the SCell of the UE transmits a cell key request to the MME and receives key information from the MME.

In block 702, the SCell transmits the key information received from the MME to the UE, and receives a response message from the UE.

The method shown in FIG. 7 is illustrated in detail hereinafter with reference to an example.

A fourth example describes a method for requesting for the KeNB by the SCell. The object of this method is to make the PCell unknowable the KeNB used by the SCell and make the eNB where the PCell is located unable to encrypt data, so as to improve the security of encryption. The method shown in FIG. 8 includes follow blocks.

Blocks 801 to 809 are identical to blocks 401 to 409 respectively and are omitted herein.

Blocks after block 810 do not depend on blocks 801 to 809, and the implementation before block 810 may be replaced with other implementation, for example, the PCell does not configure the KeNB for the SCell, or the PCell configures the same KeNB as that used by the PCell for the SCell.

In block 810, the SCell transmits a cell key request message to request the MME to configure a new KeNB. The cell key request message contains an identity of cell, and the identity of cell may be a unique CGI.

In block 811, the MME transmits key information to the SCell, and the key information contains information for generating the new KeNB. The key information may be the KeNB, or information for calculating the KeNB.

In block 812, the SCell transmits the configuration information of the KeNB to the UE, and the configuration information contains the identity of cell, and information for generating the KeNB. The configuration information may be the KeNB, or information for calculating the KeNB.

In block 813, the UE transmits a cell key confirmation to confirm that the UE receives the information of the new KeNB.

And thus, the process described in the fourth example ends.

If the KeNB used by the SCell is different from the KeNB used by the PCell, it is needed to generating and saving encryption information of cell at the UE side, where the encryption information contains encryption capability and the KeNB.

The forgoing are the methods for configuring and transmitting a key provided by the present application. By the methods, the data of the SCell is transmitted after being encrypted, so as to avoid a case that the data is decoded by other users, and further guarantee the security of the data.

The foregoing is only preferred examples of the present application and is not used to limit the protection scope of the present application. Any modification, equivalent substitution and improvement without departing from the spirit and principle of the present application are within the protection scope of the present application.

The invention claimed is:

1. A method for configuring security information in a communication system by a first base station associated with a Primary Cell (PCell), comprising:
    a) determining security information which is different from security information used by the first base station;
    b) transmitting, to a second base station associated with Secondary Cells (SCells) only, a first message for adding a first cell of the SCells associated with the second base station, wherein the first message includes the determined security information to be used by the first cell of the cell group associated with the second base station; and
    c) transmitting, to the second base station, a second message for adding a second cell of the SCells associated with the second base station,
    wherein security information to be used by the second cell associated with the second base station is the same as the determined security information to be used by the first cell associated with the second base station.

2. The method of claim 1, further comprising;
    transmitting to a terminal, a third message for reconfiguration including configuration information of the second base station,
    wherein the third message includes a radio resource control (RRC) ConnectionReconfiguration message.

3. The method of claim 2, wherein the configuration information includes information related to the determined security information to be used by the first cell and the second cell associated with the second base station.

4. The method of claim 1, wherein, the first message includes a secondary evolved-Node B (SeNB) addition request message including an X2 message.

5. The method of claim 1, wherein the first message includes at least one an identification of a terminal served by the first base station or an identification of an evolved universal mobile telecommunications service (UMTS) terrestrial radio access network (E-UTRAN) radio access bearer (RAB) (E-RAB).

6. A method for configuring security information in a communication system by a second base station associated with Secondary Cells (SCells) only, comprising:
    receiving, from a first base station associated with a Primary Cell (PCell), a first message for adding a first cell of the SCells associated with the second base station, wherein the first message includes security information which is different from security information used by the first base station;
    receiving, from the first base station, a second message for adding a second cell of the SCells associated with the second base station,
    wherein the received security information to be used by the first cell associated with the second base station is determined by the first base station, and
    wherein security information to be used by the second cell associated with the second base station is the same as the received security information to be used by the first cell associated with the second base station.

7. The method of claim 6,
wherein the received security information to be used by the first cell and the second cell associated with the second base station is related to information which is included in configuration information associated with the second base station, and
wherein the configuration information associated with the second base station is included in a third message transmitted from the first base station to a terminal.

8. The method of claim 7, wherein the third message includes a radio resource control (RRC) ConnectionReconfiguration message.

9. The method of claim 6, wherein the first message includes a secondary evolved-Node B (SeNB) addition request message including an X2 message.

10. The method of claim 6, wherein the first message includes at least one of an identification of a terminal served by the first base station or an identification of an evolved universal mobile telecommunications service (UMTS) terrestrial radio access network (E-UTRAN) radio access bearer (RAB) (E-RAB).

11. A method by a terminal in a communication system, the method comprising:
receiving, from a first base station associated with a Primary Cell (PCell), a first message including first information on reconfiguration of a first cell and a second cell associated with a second base station, the second base station associated with Secondary Cells (SCells) only, and the first cell and the second cell being included in the SCells; and
transmitting, to the first base station, a second message in response to the first message,
wherein the first information includes second information related to first security information which is different from security information used by the first base station,
wherein the first security information is included in a third message transmitted from the first base station to the second base station for adding the first cell associated with the second base station, and
wherein second security information to be used by the second cell associated with the second base station is the same as the first security information to be used by the first cell associated with the second base station.

12. The method of claim 11, wherein the first message includes a radio resource control (RRC) ConnectionReconfiguration message.

13. A first base station associated with a Primary Cell (PCell) for configuring security information in a communication system, comprising:
a transceiver; and
a controller configured to determine security information which is different from security information used by the first base station, to transmit, by the transceiver, a first message for adding a first cell of Secondary Cells (SCells) associated with a second base station to the second base station, wherein the first message includes the determined security information to be used by the first cell associated with the second base station and to transmit, by the transceiver, a second message for adding a second cell of the SCells associated with the second base station to the second base station,
wherein security information to be used by the second cell associated with the second base station is the same as the determined security information to be used by the first cell associated with the second base station, and
wherein the second base station is associated with the SCells only.

14. The first base station of claim 13,
wherein the controller is further configured to transmit, by the transceiver, a third message for reconfiguration including configuration information associated with the second base station to a terminal, and
wherein the third message includes a radio resource control (RRC) ConnectionReconfiguration message.

15. The first base station of claim 14, wherein the configuration information includes information related to the determined security information to be used by the first cell and the second cell associated with the second base station.

16. The first base station of claim 13, wherein, the first message includes a secondary evolved-Node B (SeNB) addition request message including an X2 message.

17. The first base station of claim 13, wherein the first message includes at least one an identification of a terminal served by the first base station or an identification of an evolved universal mobile telecommunications service (UMTS) terrestrial radio access network (E-UTRAN) radio access bearer (RAB) (E-RAB).

18. A second base station associated with Secondary Cells (SCells) only for configuring security information in a communication system, comprising:
a transceiver; and
a controller configured to:
receive, by the transceiver, a first message for adding a first cell of the SCells associated with the second base station from a first base station associated with a Primary Cell (PCell), wherein the first message includes security information which is different from security information used by the first base station, and
receive, by the transceiver, a second message for adding a second cell of the SCells associated with the second base station from the first base station,
wherein the received security information to be used by the first cell associated with the second base station is determined by the first base station, and
wherein security information to be used by the second cell associated with the second base station is the same as the received security information to be used by the first cell associated with the second base station.

19. The second base station of claim 18,
wherein the received security information to be used by the first cell and the second cell associated with the second base station is related to information which is included in configuration information associated with the second base station,
wherein the configuration information associated with the second base station is included in a third message transmitted from the first base station to a terminal, and
wherein the third message includes a radio resource control (RRC) ConnectionReconfiguration message.

20. The second base station of claim 18, wherein the first message includes a secondary evolved-Node B (SeNB) addition request message including an X2 message.

* * * * *